United States Patent
Byun et al.

(10) Patent No.: US 9,502,172 B2
(45) Date of Patent: Nov. 22, 2016

(54) WIRELESS POWER TRANSMITTER, METHOD OF CONTROLLING THE SAME, AND TEMPERATURE COMPENSATION METHOD FOR LOAD VALUE OF THE WIRELESS POWER TRANSMITTER

(71) Applicant: Samsung Electronics Co., Ltd., Gyeonggi-do (KR)

(72) Inventors: Kang-Ho Byun, Gyeonggi-do (KR); Hong-Kweun Kim, Gyeonggi-do (KR); Seung-Woo Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 679 days.

(21) Appl. No.: 13/938,614

(22) Filed: Jul. 10, 2013

(65) Prior Publication Data

US 2014/0015333 A1 Jan. 16, 2014

(30) Foreign Application Priority Data

Jul. 10, 2012 (KR) ........................ 10-2012-0075236

(51) Int. Cl.
*H01F 38/14* (2006.01)
*H02J 5/00* (2016.01)

(52) U.S. Cl.
CPC ............... *H01F 38/14* (2013.01); *H02J 5/005* (2013.01)

(58) Field of Classification Search
None
See application file for complete search history.

(56) References Cited

U.S. PATENT DOCUMENTS

| 2009/0054018 A1* | 2/2009 | Waheed | H03G 3/3047 455/126 |
| 2012/0119914 A1* | 5/2012 | Uchida | H02J 5/005 340/584 |
| 2012/0306269 A1 | 12/2012 | Kim et al. | |
| 2013/0033118 A1* | 2/2013 | Karalis | H02J 17/00 307/104 |

FOREIGN PATENT DOCUMENTS

KR 1020120135084 12/2012

* cited by examiner

*Primary Examiner* — Jared Fureman
*Assistant Examiner* — Joel Barnett
(74) *Attorney, Agent, or Firm* — The Farrell Law Firm, P.C.

(57) ABSTRACT

A wireless power transmitter, which detects a load change in a wireless power transmission, includes a power supply unit, a power converter which converts the driving power supplied from the power supply unit into Alternating Current, a power transmitter which wirelessly transmits the converted driving power to the wireless power transmitter, a temperature measurement unit which measures a temperature of the wireless power transmitter; and a controller which detects a current and load value of the driving power output from the power supply unit, compensates for the load value based on the measured temperature value, and determines a load change of the power transmitter based on the compensated load value.

14 Claims, 6 Drawing Sheets

WIRELESS POWER TRANSMITTER, METHOD OF CONTROLLING THE SAME, AND TEMPERATURE COMPENSATION METHOD FOR LOAD VALUE OF THE WIRELESS POWER TRANSMITTER

PRIORITY

This application claims priority under 35 U.S.C. §119(a) to Korean Application Ser. No. 10-2012-0075236, which was filed in the Korean Intellectual Property Office on Jul. 10, 2012, the contents of which are incorporated herein by reference.

BACKGROUND OF THE INVENTION

1. Field of the Invention

The present invention relates generally to a wireless power transmitter, a method of controlling the same, and a temperature compensation method for a load value of the wireless power transmitter.

2. Description of the Related Art

Portable terminals such as mobile phones or PDAs (Personal Digital Assistants) are driven by rechargeable batteries due to their characteristics, and electric energy for charging is supplied to the batteries by using separate charging devices. Separate contact terminals are provided at outer sides of a charging device and a battery, which are electrically connected to each other by contacting the contact terminals.

However, in the contact type charging method, since the contact terminals protrude to the outside, they may be easily damaged or contaminated due to foreign substances, such as moisture, preventing the battery from being properly charged.

To solve this problem, recent wireless charging or noncontact charging technologies have been developed and are being utilized in many electronic devices.

These wireless charging technologies uses wireless power transmission, such as systems for automatically charging a battery only by positioning a mobile phone on a charging pad without connecting the mobile phone to a separate charging connector. Wireless electric toothbrushes or shavers are well known to many consumers as devices utilizing this technology. Since electronic products are wirelessly charged, their waterproof functions and portability are improved. Further development in the wireless charging-related technologies are expected to continue to significantly develop.

The wireless charging technologies largely include an electromagnetic induction method using coils, a resonance method using resonances, and a Radio Frequency (RF)/microwave radiation method of converting electric energy to microwaves to transfer the electric energy.

Although the electromagnetic induction method has been mainly used until now, as experiments of wirelessly transmitting electric power from a distance of several meters by using microwaves recently have been successfully performed in Korea and other countries, it is expected that all electronic products can be wirelessly charged anytime and anywhere in the near future.

The power transmission method using electromagnetic induction is a method of transmitting electric power between a first coil and a second coil. An induced current is generated if a magnet is moved in a coil, in which case a magnetic field is generated at a transmitting terminal and a current is induced at a receiving terminal according to a change in a magnetic field to produce energy. This phenomenon is called magnetic induction, and a power transmission method using magnetic induction shows optimum energy transmission efficiency.

As for the resonance method, Professor Soljacic of the Massachusetts Institute of Technology (MIT) announced in 2005 that electric power can be wirelessly transmitted from a charging device more than several meters away by using a resonance power transmission principle through a coupled mode theory. The wireless charging system of the MIT team uses a physical concept of resonance by which if a tuning fork is rung, a wine glass near the tuning fork is made to ring at the same frequency. The study team resonated electromagnetic waves containing electric energy instead of resonating sounds. Since the resonated electric energy is directly transferred only when a device having a resonance frequency exists and the unused parts do not spread out into the air but are reabsorbed as electromagnetic waves, the energy does not influence machines or human bodies unlike the other electromagnetic waves.

A wireless power transmitter may recognize nearby objects and perform an operation corresponding thereto. For example, a wireless power transmitter can measure the number of wireless power receivers located nearby, and accordingly, can adjust an amount of driving power output from the wireless power receivers.

However, a configuration of recognizing nearby objects by a conventional wireless power transmitter has not been discussed, and accordingly, there is a need in the art for a technology for a configuration of recognizing nearby objects.

SUMMARY OF THE INVENTION

Accordingly, the present invention provides a wireless power transmitter for detecting a load change of wireless power transmission, a method of controlling the same, and a temperature compensation method for a load value of the wireless power transmitter.

In accordance with an aspect of the present invention, there is provided a wireless power transmitter for detecting a load change in a wireless power transmission, the wireless power transmitter including a power supply unit which supplies driving power of the wireless power transmitter, a power converter which converts the driving power supplied from the power supply unit into Alternating Current (AC) form, a power transmitter which wirelessly transmits the converted driving power to the wireless power transmitter, a temperature measurement unit which measures a temperature value of at least one portion of the wireless power transmitter, and a controller which detects a current value and a load value of the driving power output from the power supply unit, compensates for the load value based on the measured temperature value, and determines a load change of the power transmitter based on the compensated load value.

In accordance with an aspect of the present invention, there is provided a method of controlling a wireless power transmitter for detecting a change in a load change of wireless power transmission, the method including supplying driving power of the wireless power transmitter, converting the driving power into AC form, wirelessly transmitting the converted driving power to a wireless power receiver, detecting a current value and a load value of the driving power, measuring a temperature value of at least one portion of the wireless power transmitter, compensating the load value based on the measured temperature value, and determining a wireless power transmission state of the power transmitter based on the compensated load value.

In accordance with an aspect of the present invention, there is provided a temperature compensation method for a load value of a wireless power transmitter for wirelessly transmitting electric power to a wireless power receiver, the method including measuring a reference load value which is a load value of the wireless power transmitter in the case where there exists no wireless power receiver, measuring a temperature of a portion of the wireless power transmitter, reading out a temperature compensation constant for a linear relationship between a temperature value and a load value, determining a temperature compensation reference load value which is a reference load value for a preset temperature, based on the temperature, the temperature compensation constant, and the reference load value, determining an offset between the temperature compensation reference value and the reference load value, and compensating for the load value based on the offset.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
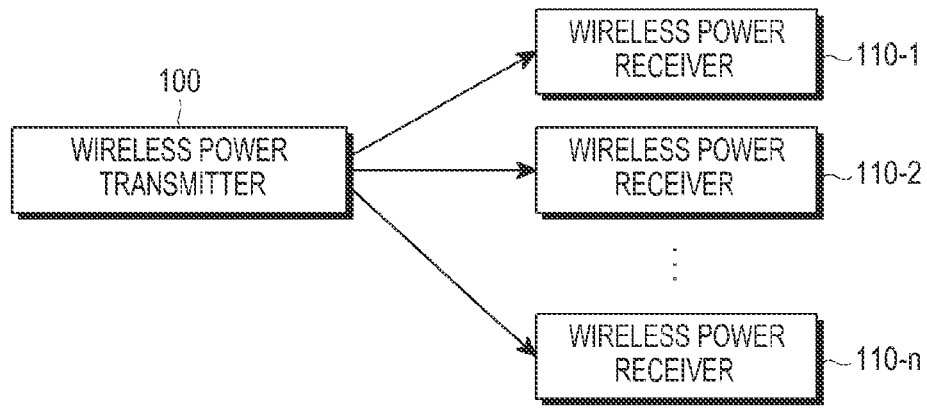
FIG. 1 illustrates a wireless power transmission/reception system according to an embodiment of the present invention.

Hereinafter, embodiments of the present invention will be described in more detail with reference to the accompanying drawings. It is noted that the same or like reference numerals denote the same or like constituent elements. In the following description and accompanying drawings, a detailed description of known functions and configurations incorporated herein will be omitted when it may make the subject matter of the present invention rather unclear.

FIG. 1 illustrates a wireless power transmission/reception system according to an embodiment of the present invention. As illustrated in FIG. 1, the wireless power transmission/reception system includes a wireless power transmitter 100, and a plurality of wireless power receivers 110-1, 110-2, . . . , and 110-n. The wireless power transmitter 100 forms electrical connections with the wireless power receivers 110-1, 110-2, . . . , and 110-n. In the embodiment of FIG. 1, the wireless power transmitter 100 supplies wireless electric power to the wireless power receivers 110-1, 110-2, . . . , and 110-n in the form of electromagnetic waves.

The wireless power transmitter 100 performs bidirectional communications with the wireless power receivers 110-1, 110-2, . . . , and 110-n. In this case, the wireless power transmitter 100 and the wireless power receivers 110-1, 110-2, . . . , and 110-n are capable of processing or transmitting and receiving communication packets, and may be realized by such devices as mobile phones, Personal Data Assistants (PDAs), Portable Media Players (PMPs) and smart phones.

The wireless power transmitter 100 wirelessly provides electric power to the wireless power receivers 110-1, 110-2, . . . , and 110-n. For example, the wireless power transmitter 100 transmits electric power to the plurality of the wireless power receivers 110-1, 110-2, . . . , and 110-n through a resonance method. When the wireless power transmitter 100 employs the resonance method, distance between the wireless power transmitter 100 and the plurality of the wireless power receivers 110-1, 110-2, . . . , and 110-n is about 30 m or less. Further, when the wireless power transmitter 100 employs the electromagnetic induction method, distance between the wireless power transmitter 100 and the wireless power receivers 110-1, 110-2, . . . , and 110-n is about 10 cm or less.

The wireless power receivers 110-1, 110-2, . . . , and 110-n receives wireless electric power from the wireless power transmitter 100 and charge the batteries installed in the wireless power receivers 110-1, 110-2, . . . , and 110-n. Further, the wireless power receivers 110-1, 110-2, . . . , and 110-n transmit signals for requesting wireless power transmission, information necessary for wireless power transmission, wireless power receiver state information, or wireless power transmitter 100 control 30 information. The information of the transmission signal will be described in detail below.

The wireless power receivers 110-1, 110-2, . . . , and 110-n transmit location information messages of the wireless power receivers 110-1, 110-2, . . . , and 110-n, which messages may be realized by near field communications such as RF signals or Bluetooth® and will be described in detail below.

The wireless power receivers 110-1, 110-2, . . . , and 110-n transmit charging state messages indicating their charging states to the wireless power transmitter 100.

The wireless power transmitter 100 includes a display unit such as a display, and displays states of the wireless power receivers 110-1, 110-2, . . . , and 110-n based on the messages received from the wireless power receivers 110-1, 110-2, . . . , and 110-n. In addition, the wireless power transmitter 100 displays time periods for which the wireless power receivers 110-1, 110-2, . . . , and 110-n are expected to be completely charged.

The wireless power transmitter 100 transmits a control signal for disabling the wireless charging functions of the wireless power receivers 110-1, 110-2, . . . , and 110-n, which having received a control signal for disabling the wireless charging functions thereof from the wireless power transmitter 100, may disable the wireless charging functions.

Figure 2:
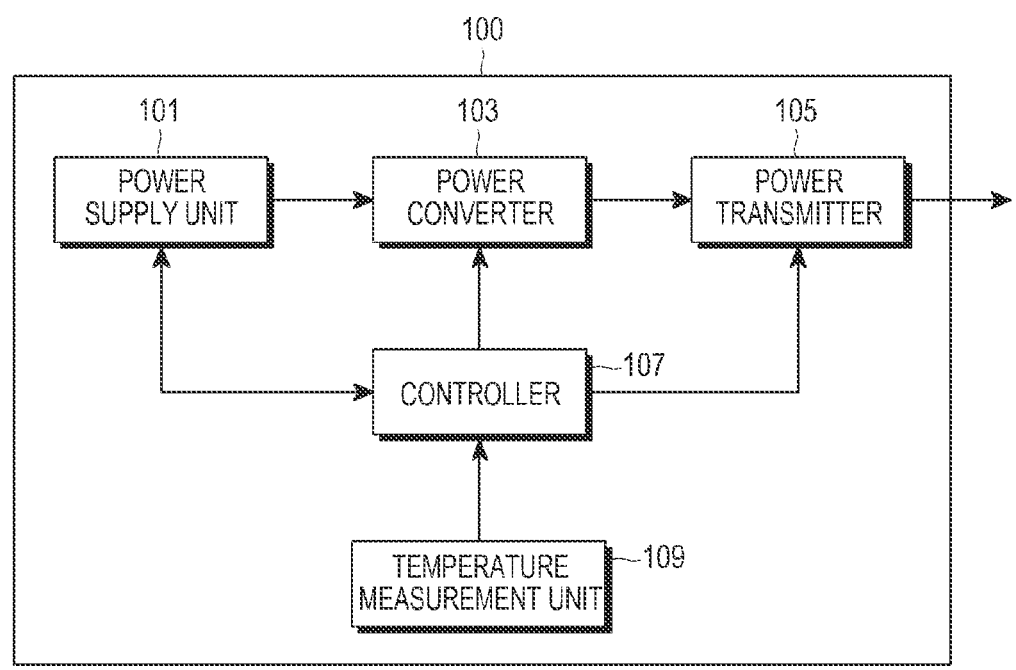
FIG. 2 illustrates a wireless power transmitter according to an embodiment of the present invention.

FIG. 2 illustrates a wireless power transmitter according to an embodiment of the present invention.

As illustrated in FIG. 2, the wireless power transmitter 100 includes a power supply unit 101, a power converter 103, a power transmitter 105, a controller 107, and a temperature measurement unit 109.

The power supply unit 101 provides electric power to be supplied to the wireless power receivers in the form of DC waveforms. The power supply unit 101 may be realized by a unit for providing Direct Current (DC) power, such as a battery, or may be realized by a configuration of receiving AC power from the outside and providing DC power via a conversion process. An applied voltage Vdd of the power supply unit 101 may be changed under the control of the controller 107.

The power converter 103 converts the DC power input from the power supply unit 101 into AC waveforms. The power converter 103 may be realized by a known inverter, and the power frequency fs or duty cycle τ of the power converter 103 may be changed under the control of the controller 107.

The power transmitter 105 provides electric power to the wireless power receivers in the form of AC power forms. The power transmitter 105 supplies electric power in the form of DC waveforms and the supplied electric power may be converted into AC waveforms by using an inverter to be supplied in the form of AC waveforms.

In addition, the power transmitter 105 provides AC waveforms in the form of electromagnetic waves. The power transmitter 105 may further include a loop coil, and accordingly, transmits or receive electromagnetic waves. When the power transmitter 105 is realized by a loop coil, the inductance L of the loop coil may be changed. It can be understood by those skilled in the art that any unit capable of transmitting and receiving electromagnetic waves may be applied as the power transmitting unit 105 without limitation.

Although not illustrated, an impedance matching unit (not illustrated) may be further included between the power converter 103 and the power transmitter 105. The impedance matching unit (not illustrated) performs impedance matching between AC power output from the power converter 103 and the power transmitter 105.

The controller 107 controls an overall operation of the wireless power transmitter 100. The controller 107 controls an overall operation of the wireless power transmitter 100 by using an algorithm, a program or an application required for control which is read out from the storage unit (not illustrated). The controller 107 may be realized in the form of, for example, a Central Processing Unit (CPU), a microprocessor, or a mini computer. A detailed operation of the controller 201 will be described in detail below.

The controller 107 measures a load value of one point of the wireless power transmitter 100, such as a front end of the power transmitter 105. The controller 107 may detect a nearby object of the wireless power transmitter 100 based on a change in a load value. For example, when a first load value is measured, the controller 107 determines that no nearby object is disposed around the wireless power transmitter 100. When a second load value different from the first load value is measured, the controller 107 determines that one wireless power receiver is disposed around the wireless power transmitter 100. When a third load value different from the first load value and the second load value is measured, the controller 107 determines that two wireless power receivers are disposed around the wireless power transmitter 100. In addition, the controller 107 measures various load values, and accordingly, may determine various preset situations.

Figure 3A:
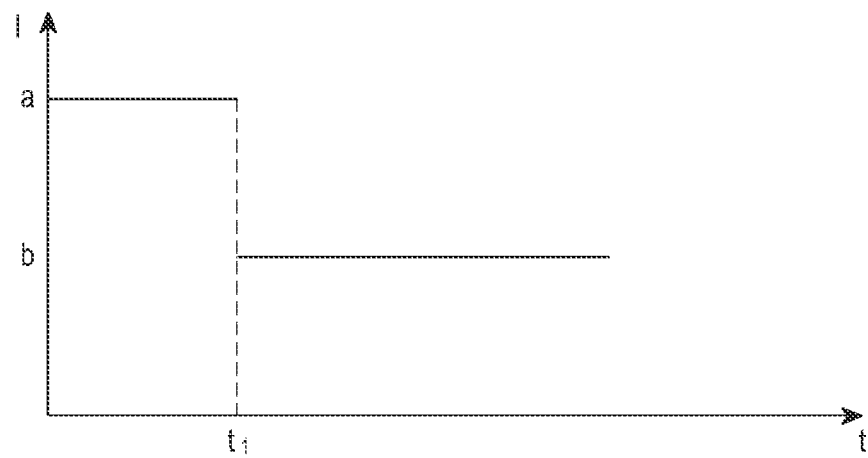
FIGS. 3A and 3B illustrate a configuration for determining a surrounding situation.

FIG. 3A illustrates a configuration for determining a surrounding situation. The controller 107 measures a current value of a value a till t1 and determines that no nearby object exists around the controller 107 in response to a first load value corresponding to the current of a value a. The controller 107 measures a current value of a value b after t1 and determines that one wireless power receiver exists around the controller 107 in response to a second load value corresponding to the current of a value b. The first load value when no nearby object exists around the wireless power transmitter 100 will be referred to as a reference load value.

The temperature measurement unit 109 measures a temperature of one point of the wireless power transmitter 100. For example, the temperature measurement unit 109 measures a temperature of one of the Field-Effect Transistor (FET) devices in the wireless power transmitter 100, and the measured temperature information is output to the controller 107.

The controller 107 compensates for a load value according to the measured temperature. The load value measured by the controller 107 may be changed according to temperature, and accordingly, the controller 107 may misinterpret the surrounding situation.

Figure 3B:
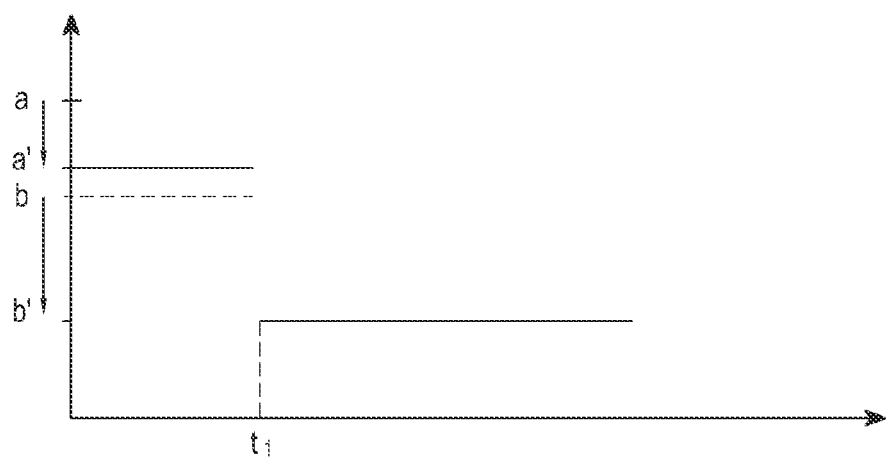

FIG. 3B illustrates the above-described problem. As illustrated in FIG. 3B, when an internal temperature of the wireless power transmitter 100 increases, a current value at one point of the wireless power transmitter 100 changes from a to a' and b to b'. Accordingly, the controller 107 may misinterpret the load value corresponding to a' as a second load value.

The controller 107 may compensate for the load value changed by temperature. For example, the controller 107 may compensate for the load value corresponding to a' to the first load value corresponding to a again. The controller 107 determines a load change based on the load value compensated for temperature, that is, the first load value. The process of compensating for the load value for temperature by the controller 107 will be described in detail with reference to FIG. 4.

As described above, the controller 107 may detect a change in a surrounding situation, for example, a change in the number of wireless power receivers based on a change in a load value. In addition, the load value for temperature may be compensated for by the controller 107, and accordingly, a more accurate change in a surrounding situation may be detected.

Figure 4:
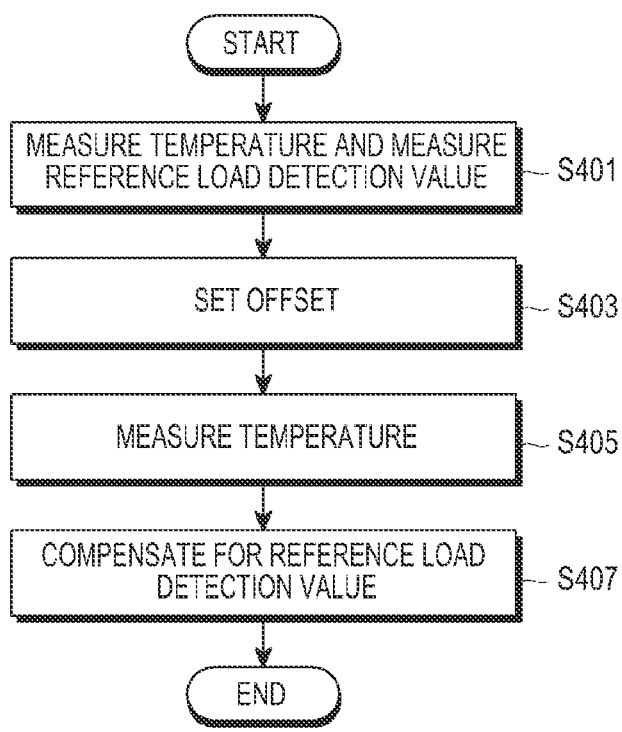
FIG. 4 illustrates a method of compensating for a load value for a temperature according to an embodiment of the present invention.

FIG. 4 illustrates a method of compensating for a load value for a temperature according to an embodiment of the present invention. The controller 107 measures a load value at one point of the wireless power transmitter 100. In addition, the controller 107 receives temperature information of the wireless power transmitter 100 from the temperature measurement unit 109. In this case, the controller 107 first measures a reference load value, that is, a load value when no nearby object is disposed around the wireless power transmitter 100 in step S401.

The controller 107 reads out a temperature compensation reference load value which is a reference load value for a present temperature stored in the storage unit (not illustrated) in advance. The controller 107 determines an offset between the temperature compensation reference load value and the reference load value in step S403.

The temperature measurement unit 109 measures temperature again in step S405, and if there is no temperature change, may compensate for the measured load values based on the determined offset in step S407.

Figure 5A:
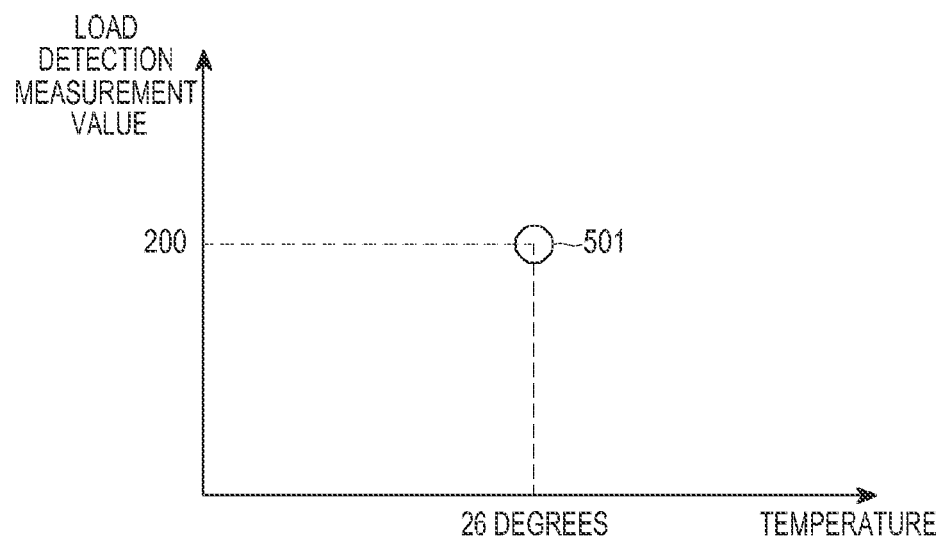
FIGS. 5A to 5C illustrate a process of compensating for a load value for a temperature by a controller of the present invention.
Figure 5B:
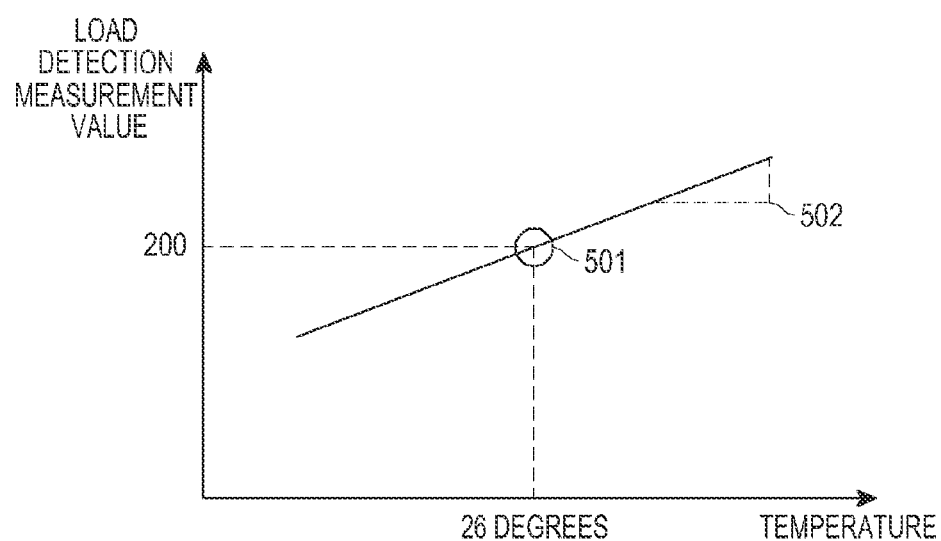
Figure 5C:
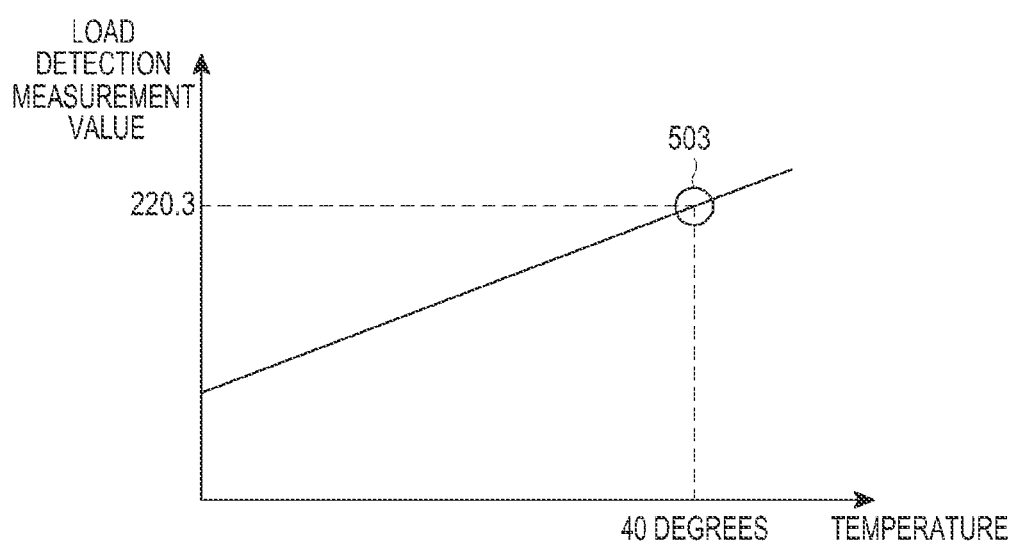

FIGS. 5A to 5C illustrate a process of compensating for a load value for a temperature by a controller of the present invention.

The controller 107 may detect, for example, a temperature of 26 degrees and a load value of 200Ω, which may be a reference load value as illustrated in FIG. 5A. The controller 107 subtracts a value obtained by multiplying a temperature and a temperature compensation constant, from a reference load value to determine an offset. For example, the controller 107 may subtract a product of 26 and 29/20 from 200 to determine an offset of 162.3. As illustrated in FIG. 5B, the temperature compensation constant 502 is a value which is determined by measuring a reference load value for temperature. Alternatively, the controller 107 may determine a difference between a reference load value for a specific temperature stored in advance and a measured load value as an offset.

As illustrated in FIG. 5C, even when the temperature is different from the initial measure temperature, the controller 107 may compensate for a load value for temperature by using an offset. For example, the controller 107 may predict a load value based on the linearity of the temperature compensation constant, and subtract an offset from the load value to determine the compensated load value.

As described above, the controller 107 may compensate for a load value for temperature according to various methods, and accordingly, may detect a more accurate change in a load value.

The controller 107 may repeat the above-described process, for example, whenever the controller 107 is operated. Alternatively, the controller 107 may repeat the above-described process in a preset cycle.

Figure 6:
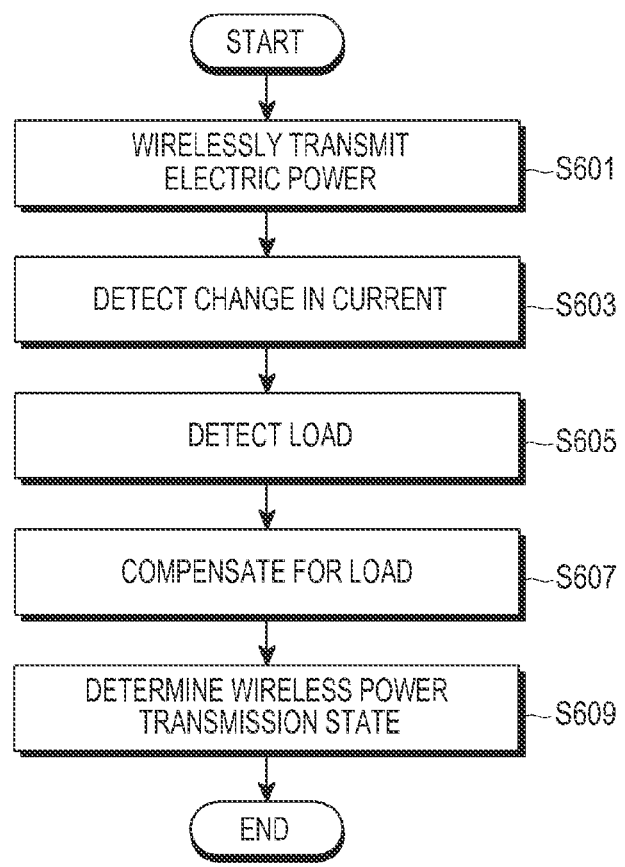
FIG. 6 illustrates a method of detecting a load change of wireless power transmission according to an embodiment of the present invention.

FIG. 6 illustrates a method of detecting a load change of wireless power transmission according to an embodiment of the present invention. The wireless power transmitter transmits wireless electric power in step S601, in which case the wireless power transmitter measures a current in the process of transmitting wireless electric power. The wireless power transmitter measures, for example, a current applied to a front end of the power transmitter.

The wireless power transmitter continuously measures current, and detects a change in a current to detect a change in a load value in step S603.

When the current value is changed, the wireless power transmitter detects the changed load value in step S605. The wireless power transmitter compensates for the detected load value for a temperature in step S607, and determines a wireless power transmission state based on the compensated load value in step S609.

As described above, the wireless power transmitter compensates for a load valve with respect to a temperature based on two methods.

The wireless power transmitter compensates for a load based on an offset determined during the initial driving thereof. For example, the wireless power transmitter measures a reference load value and a temperature during the initial driving, reads out temperature compensation reference load value information corresponding to a specific temperature, determines a difference between the temperature compensation reference load value and the reference load value as an offset, and applies the offset to the measured load value to determine a compensated load value when there is no temperature change.

Alternatively, a load value may be compensated for in an environment having a temperature change based on a temperature compensation constant by the wireless power transmitter. For example, the wireless power transmitter may predict a changed load value based on the linearity of the temperature compensation constant. In addition, the wireless power transmitter may apply an offset to the predicted load value to determine a compensated load value.

As described above, the wireless power transmitter may recognize a surrounding situation through detection of a load value, and may more clearly recognize the surrounding situation through temperature compensation.

Although embodiments of the present invention have been illustrated and described until now, it will be understood that those skilled in the art to which the present invention pertains can variously change the embodiments of the present invention without departing from the spirit and scope of the present invention. Thus, various modifications can be made without departing from the essence of the present invention defined in the claims, and the modifications should not be construed as separate from the technical spirit or prospect of the present invention.

What is claimed is:

1. A wireless power transmitter for detecting a load change in a wireless power transmission, the wireless power transmitter comprising:
   a power supply unit which supplies a driving power of the wireless power transmitter;
   a power converter which converts the driving power supplied from the power supply unit into Alternating Current (AC) power;
   a power transmitter which wirelessly transmits the AC power to at least one wireless power receiver;
   a temperature measurement unit which measures a first temperature value of at least one portion of the wireless power transmitter; and
   a controller which detects a first load value at an output of the driving power, compensates for the first load value based on the first temperature value, and determines a load change of the power transmitter based on a difference between the compensated first load value and a formerly detected load value.

2. The wireless power transmitter of claim 1, wherein the controller detects a change in the number of the at least one wireless power receiver receiving the AC power from the wireless power transmitter based on the load change.

3. The wireless power transmitter of claim 1, further comprising a storage unit which stores a temperature compensation constant for a linear relationship between a temperature value and a load value.

4. The wireless power transmitter of claim 3, wherein the controller measures a reference load value, which is a second load value when there is no wireless power receiver for receiving the AC power from the wireless power transmitter.

5. The wireless power transmitter of claim 4, wherein the storage unit stores a temperature compensation reference load value, which is a second reference load value for a preset temperature, and the controller determines an offset between the temperature compensation reference load value and the reference load value.

6. The wireless power transmitter of claim 5, wherein the controller determines the compensated load value based on the first load value and the offset.

7. The wireless power transmitter of claim 2, wherein the controller determines the change in the number of the wireless power receivers receiving the AC power from the wireless power transmitter based on the compensated load value.

8. A method of controlling a wireless power transmitter for detecting a load change of wireless power transmission, the method comprising:
   supplying a driving power of the wireless power transmitter;
   converting the driving power into Alternating Current (AC) power;
   wirelessly transmitting the AC power to at least one wireless power receiver;
   detecting a first load value of the driving power;
   measuring a first temperature value of at least one portion of the wireless power transmitter;

compensating the first load value based on the first temperature value; and determining a wireless power transmission state of the power transmitter based on the compensated first load value.

9. The method of claim 8, wherein the wireless power transmission state corresponds to a number of the at least one wireless power receiver receiving the AC power from the wireless power transmitter.

10. The method of claim 8, further comprising storing a temperature compensation constant for a linear relationship between a temperature value and a load value.

11. The method of claim 10, wherein when compensating for the load value, a reference load value, which is a second load value when there exists no wireless power receiver, is determined.

12. The method of claim 11, further comprising storing a temperature compensation reference load value, which is a second reference load value for a preset temperature, wherein when compensating for the load value based on the measured temperature value, an offset between the temperature compensation reference load value and the reference load value is determined.

13. The method of claim 12, wherein when compensating for the load value based on the measured temperature value, the compensated load value is determined based on the first load value and the offset.

14. The method of claim 9, wherein when determining the wireless power transmission state, the change in the number of the at least one wireless power receiver receiving the AC power from the wireless power transmitter is determined based on the compensated load value.

* * * * *